United States Patent
Lu et al.

(10) Patent No.: US 12,513,747 B2
(45) Date of Patent: Dec. 30, 2025

(54) DATA TRANSMISSION METHOD, DATA TRANSMISSION APPARATUS, MULTI-LINK DEVICE, AND STORAGE MEDIUM

(71) Applicant: GUANGDONG OPPO MOBILE TELECOMMUNICATIONS CORP., LTD., Dongguan (CN)

(72) Inventors: Liuming Lu, Dongguan (CN); Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/236,602

(22) Filed: Jun. 12, 2025

(65) Prior Publication Data
US 2025/0311004 A1 Oct. 2, 2025

Related U.S. Application Data

(63) Continuation of application No. 18/771,906, filed on Jul. 12, 2024, which is a continuation of application No. PCT/CN2022/073304, filed on Jan. 21, 2022.

(51) Int. Cl.
*H04L 5/00* (2006.01)
*H04W 74/0816* (2024.01)

(52) U.S. Cl.
CPC ....... *H04W 74/0816* (2013.01); *H04L 5/0053* (2013.01)

(58) Field of Classification Search
CPC ......... H04W 74/0816; H04W 52/0219; H04W 76/15
See application file for complete search history.

(56) References Cited

U.S. PATENT DOCUMENTS

| 11,924,911 B2* | 3/2024 | Seok | H04W 8/005 |
|---|---|---|---|
| 2012/0063492 A1* | 3/2012 | Palanki | H04W 56/001 375/211 |
| 2022/0312506 A1* | 9/2022 | Xia | H04W 74/0891 |
| 2023/0144291 A1* | 5/2023 | Naik | H04W 74/0816 370/329 |
| 2025/0063505 A1* | 2/2025 | Cariou | H04W 52/0219 |

OTHER PUBLICATIONS

P802.15.4A Alt PHY Selection Criteria (Year: 2004).*
802.16.1 Functionla Requirements, Rev.1 (Year: 1999).*
(Continued)

*Primary Examiner* — Faruk Hamza
*Assistant Examiner* — Abusayeed M Haque
(74) *Attorney, Agent, or Firm* — Quarles & Brady LLP

(57) ABSTRACT

A data transmission method, a data transmission apparatus, a multi-link device (MLD), and a storage medium are provided. In the method, a first frame comprising first transmission mode information is received by a first non-access point (non-AP) station (STA) affiliated with a non-AP multi-link device (MLD). The first transmission mode information is related to one of transmission modes of the non-AP MLD, and the transmission modes allow none or at least one of the first non-AP STA and a second non-AP STA affiliated with the non-AP MLD has a right to initiate a transmission opportunity (TXOP) for frame exchange.

20 Claims, 7 Drawing Sheets

(56) References Cited

OTHER PUBLICATIONS

"IEEE P802.11be™/D1.3 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 8: Enhancements for extremely high throughput (EHT)" of the 802.11 Working Group of the LAN/MAN Standards Committee of the IEEE Computer Society dated Nov. 2021.

"IEEE P802.11 Wireless LANs IEEE P802.11 Wireless LANs" of doc.: IEEE 802.11-21/1685r6 dated Jul. 11, 2021.

* cited by examiner

DATA TRANSMISSION METHOD, DATA TRANSMISSION APPARATUS, MULTI-LINK DEVICE, AND STORAGE MEDIUM

CROSS-REFERENCE TO RELATED APPLICATIONS

This application is a continuation of U.S. patent application Ser. No. 18/771,906, filed on Jul. 12, 2024, which is a continuation of International Application No. PCT/CN2022/073304, filed on Jan. 21, 2022. All of the afore-mentioned patent applications are hereby incorporated by reference in their entireties.

TECHNICAL FIELD

The present disclosure generally relates to the field of communication, in particular, to a data transmission method, a data transmission apparatus, a multi-link device, and a storage medium.

BACKGROUND

In IEEE 802.11be or Wi-Fi 7, a multi-link operation (MLO) is proposed to provide higher throughput, lower latency, and/or higher reliability. MLO enables a non-access point (non-AP) multi-link device (MLD) to discover, authenticate, associate, and set up multiple links with an AP MLD. Each link enables channel access and frame exchanges between the non-AP MLD and the AP MLD based on the supported capabilities exchanged during association.

It should be noticed that multiple access points (APs) affiliated with an AP MLD may be operating on multiple links. Also, multiple non-AP stations (STAs) affiliated with a non-AP MLD may be operating on multiple links. Regarding some multi-link operations, when a non-AP STA of a non-AP MLD is exchanging frames with an AP affiliated with an AP MLD on one of links, the other non-AP STAs affiliated with the same non-AP MLD on the links are blind. The handling of the blindness issue for a non-AP MLD may be complex and occupy a lot of the resources of non-AP STAs. How to avoid the blindness issue needs to be researched.

SUMMARY

Exemplary embodiments of the disclosure provide a data transmission method, a data transmission apparatus, a multi-link device (MLD), and a storage medium, to resolve the synchronization problem between a pair of links.

According to one or more exemplary embodiments of the disclosure, a data transmission method is provided. The data transmission method includes, but is not limited to, the following steps. A first frame including first transmission mode information is transmitted by a first non-access point (non-AP) station (STA) affiliated with a non-AP multi-link device (MLD). The first transmission mode information is related to one of transmission modes of the non-AP MLD, and the transmission modes allow none or at least one of the first non-AP STA and a second non-AP STA affiliated with the non-AP MLD has a right to initiate a transmission opportunity (TXOP) for frame exchange.

According to one or more exemplary embodiments of the disclosure, a data transmission method is provided. The data transmission method includes, but is not limited to, the following steps. A first non-AP STA affiliated with a non-AP MLD on a first link of links loses medium synchronization due to a transmission event of a second non-AP STA affiliated with the non-AP MLD or the first non-AP STA affiliated with the non-AP MLD intends for uplink (UL) transmission is determined. Access point (AP) assistance request information is transmitted on a second link of the links by a second non-AP STA affiliated with the non-AP MLD. The AP assistance request information is used to solicit an assisting AP affiliated with an AP MLD to assist the first non-AP STA affiliated with the non-AP MLD operating on the first link to recover the medium synchronization or to trigger the UL transmission.

According to one or more exemplary embodiments of the disclosure, a data transmission method is provided. The data transmission method includes, but is not limited to, the following steps. A first frame including transmission mode information is received by a first AP affiliated with an AP MLD. The transmission mode information is related to one of transmission modes of a non-AP MLD. The transmission modes allow none or at least one of a first non-AP STA and a second non-AP STA affiliated with the non-AP MLD operating on one of links has a right to initiate a TXOP for frame exchange.

According to one or more exemplary embodiments of the disclosure, a data transmission method is provided. A first AP affiliated with an AP MLD on a first link of links loses medium synchronization due to a transmission event of a second AP affiliated with the AP MLD or the first AP affiliated with the AP MLD intends for UL transmission is determined. AP assistance request information is received on a second link of the links by a second AP affiliated with an AP MLD. The AP assistance request information is used to solicit the first AP affiliated with the AP MLD to assist a non-AP STA affiliated with a non-AP MLD operating on the first link to the recover medium synchronization or trigger the UL transmission.

According to one or more exemplary embodiments of the disclosure, a data transmission apparatus is provided. The data transmission apparatus includes a transmitting module. The transmitting module is configured for transmitting, by a first non-AP STA affiliated with a non-AP MLD, a first frame, the first frame comprising first transmission mode information related to one of transmission modes of the non-AP MLD, and the transmission modes allowing none or at least one of the first non-AP STA and a second non-AP STA affiliated with the non-AP MLD operating on one of links has a right to initiate a TXOP for frame exchange.

According to one or more exemplary embodiments of the disclosure, a data transmission apparatus is provided. The data transmission apparatus includes a transmitting module and a transmission handling module. The transmission handling module is configured for determining that a first non-AP STA affiliated with a non-AP MLD on a first link of links loses medium synchronization due to a transmission event of a second non-AP STA affiliated with the non-AP MLD or intends for UL transmission. The transmitting module is configured for transmitting, by a second non-AP STA affiliated with the non-AP MLD, AP assistance request information on a second link of the links. The AP assistance request information is used to solicit an assisting AP affiliated with an AP MLD to assist the first non-AP STA affiliated with the non-AP MLD operating on the first link to recover the medium synchronization or to trigger the UL transmission.

According to one or more exemplary embodiments of the disclosure, a data transmission apparatus is provided. The data transmission apparatus includes a receiving module.

The receiving module is configured for receiving, by a first AP affiliated with an AP MLD, a first frame. The first frame includes transmission mode information related to one of transmission modes of a non-AP MLD, and the transmission modes allow none or at least one of a first non-AP STA and a second non-AP STA affiliated with the non-AP MLD operating on one of links has a right to initiate a TXOP for frame exchange.

According to one or more exemplary embodiments of the disclosure, a data transmission apparatus is provided. The data transmission apparatus includes a receiving module and a transmission handling module. The transmission handling module is configured for determining that a first AP affiliated with an AP MLD on a first link of links loses medium synchronization due to a transmission event of a second AP affiliated with the AP MLD or the first non-AP STA affiliated with the non-AP MLD intends for UL transmission. The receiving module is configured for receiving by a second AP affiliated with an AP MLD, AP assistance request information on a second link of the links. The AP assistance request information is used to solicit the first AP affiliated with the AP MLD to assist a non-AP STA affiliated with a non-AP MLD operating on the first link to the recover medium synchronization or to trigger the UL transmission.

According to one or more exemplary embodiments of the disclosure, an MLD is provided. The MLD includes a memory and a processor. The memory is configured to store instructions. The processor is coupled with the memory and configured to execute the instructions to cause the MLD to perform the aforementioned data transmission method.

According to one or more exemplary embodiments of the disclosure, a chip is provided. The chip is used to implement the aforementioned data transmission method.

According to one or more exemplary embodiments of the disclosure, a computer-readable storage medium is provided. The computer-readable storage medium stores a program code to cause a computer to perform the aforementioned data transmission method.

According to one or more exemplary embodiments of the disclosure, a computer program product is provided. The computer program product includes a computer program instruction that enables a computer to execute the aforementioned data transmission method.

According to one or more exemplary embodiments of the disclosure, a computer program is provided. When the computer program is run on a computer, the computer program enables the computer to execute the aforementioned data transmission method.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION

Figure 1:
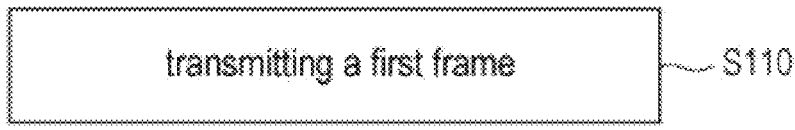
FIG. 1 is a flowchart of a data transmission method according to an exemplary embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

IEEE 802.11be Draft 1.3 has specified Enhanced multi-link single radio (EMLSR) operation, which mainly contains the following.

The non-AP MLD shall be able to listen on the EMLSR links, by having its affiliated STA(s) corresponding to those links in an awake state. The listening operation includes clear channel assessment (CCA) and receiving the initial Control frame of a frame exchange sequence that is initiated by an AP MLD.

An AP affiliated with the AP MLD initiates frame exchanges with the non-AP MLD on one of the EMLSR links shall begin the frame exchanges by transmitting the initial Control frame to the non-AP MLD with the limitations specified above.

After receiving the initial Control frame of a frame exchange sequence, the non-AP MLD shall be able to transmit or receive frames on the link in which the initial Control frame was received and shall not transmit or receive on the other EMLSR link(s) until the end of the frame exchange sequence, and subject to its spatial stream capabilities, operation mode, and link switch delay, the non-AP MLD shall be capable of receiving a PPDU that is sent using more than one spatial stream on the link in which the initial Control frame was received a short interframe space (SIFS) after the end of its response frame transmission solicited by the initial Control frame. During the frame exchange sequence, the AP MLD may not transmit frames to the non-AP MLD on the other EMLSR link(s). The non-AP MLD switches back to the listening operation on the enabled links immediately after the end of the frame exchange sequence.

However, when a non-AP STA of a non-AP MLD is exchanging frames with an AP affiliated with an AP MLD on one of the enhanced multi-link single radio (EMLSR) links, the other non-AP STAs affiliated with the same non-AP MLD on the EMLSR links are blind. There is a similar blindness problem of the nonsimultaneous transmit and receive (NSTR) non-AP MLD operation. The handling of the blindness issue for a non-AP MLD in EMLSR mode may be complex and occupy a lot of the resources of non-AP STAs. How to avoid the blindness issue needs to be researched.

On the other hand, the AP assisted medium synchronization recovery procedure has been specified for non-AP MLD with a NSTR pair in IEEE 802.11be Draft 1.3. However, the AP assisted medium synchronization recovery procedure for non-AP MLD in EMLSR mode needs to be clarified.

Before a further introduction of exemplary embodiments of the present disclosure, some rules are described as follows.

Regarding Enhanced multi-link single radio (EMLSR) operation:

When a non-AP MLD is operating in the EMLSR mode with an AP MLD supporting the EMLSR mode, the follows may be applied:

The non-AP MLD shall be able to listen on the EMLSR links, by having its affiliated STA(s) corresponding to those links in an awake state. The listening operation includes CCA and receiving the initial Control frame of a frame exchange sequence that is initiated by an AP MLD.

The initial Control frame of a frame exchange sequence shall be sent in the orthogonal frequency division multiple (OFDM) physical layer (PHY) protocol data unit (PPDU) or non-high throughput (non-HT) duplicate PPDU format using a rate of 6 Mbps, 12 Mbps, or 24 Mbps.

The initial Control frame shall be an MU-RTS Trigger frame or a BSRP Trigger frame. Reception of multi-user request to send (MU-RTS) and buffer status report poll (BSRP) Trigger frames is mandatory for a non-AP MLD that is in the EMLSR mode. The number of spatial streams for the response to the BSRP Trigger frame shall be limited to one.

The non-AP MLD shall indicate the delay time duration in the EMLSR Delay subfield of the EML Capabilities subfield in the Common Info field of the Basic Multi-Link element.

An AP affiliated with the AP MLD initiates frame exchanges with the non-AP MLD on one of the EMLSR links shall begin the frame exchanges by transmitting the initial Control frame to the non-AP MLD with the limitations specified above.

After receiving the initial Control frame of a frame exchange sequence, the non-AP MLD shall be able to transmit or receive frames on the link in which the initial Control frame was received and shall not transmit or receive on the other EMLSR link(s) until the end of the frame exchange sequence, and subject to its spatial stream capabilities, operation mode, and link switch delay, the non-AP MLD shall be capable of receiving a PPDU that is sent using more than one spatial stream on the link in which the initial Control frame was received a SIFS after the end of its response frame transmission solicited by the initial Control frame. During the frame exchange sequence, the AP MLD shall not transmit frames to the non-AP MLD on the other EMLSR link(s). The non-AP MLD switches back to the listening operation on the enabled links immediately after the end of the frame exchange sequence.

Only one STA affiliated with the non-AP MLD that is operating on one of the EMLSR links may initiate frame exchanges with the AP MLD.

Noted that a STA affiliated with a non-AP MLD operating in the EMLSR mode does not need to transmit an initial Control frame to initiate frame exchanges with the AP MLD.

Regarding AP assisted medium synchronization recovery procedure:

An AP affiliated with an AP MLD with dot11AAROptionImplemented equals to true shall set the AAR Support subfield in the MLD Capabilities field in a Basic Multi-Link element it transmits to 1; otherwise, the AP shall set the AAR Support subfield to 0.

A non-AP STA affiliated with a non-AP MLD with dot11AAROptionImplemented equals to true and that belongs to an NSTR link pair may transmit the AAR Control subfield in a frame to its associated AP affiliated with an AP MLD if it has received a Basic Multi-Link element from the AP with the AAR Support subfield equal to 1. The AAR Control subfield transmitted by a STA affiliated with a non-AP MLD carries the link identifier of another AP affiliated with the same AP MLD to solicit the other AP to transmit a Trigger frame to the other non-AP STA affiliated with the same non-AP MLD that belongs to the same NSTR link pair.

The other AP affiliated with the AP MLD should transmit a Trigger frame to the other non-AP STA affiliated with the non-AP MLD to solicit an UL PPDU if the AP MLD supports reception of the AAR Control subfield and the other AP does not have frame exchanges already scheduled with another STA.

A non-AP STA with dot11AAROptionImplemented equals to false shall not transmit a frame containing an AAR Control subfield to its associated AP.

FIG. 1 is a flowchart of a data transmission method according to an exemplary embodiment of the present disclosure. Referring to FIG. 1, a first non-AP STA affiliated with a non-AP MLD transmits a first frame to a first AP affiliated with an AP MLD (step S110). The first frame includes first transmission mode information. The first transmission mode information is related to one of transmission modes of the non-AP MLD. The transmission modes allow none or at least one of the first non-AP STA and a second non-AP STA affiliated with the non-AP MLD operating on one of links has a right to initiate a transmission opportunity (TXOP) for frame exchange.

In one embodiment, the first transmission mode information directly indicates one transmission mode of the non-AP MLD. In another embodiment, the second transmission mode information is a response of a request of the one of the transmission modes, and the response is sent by an access point (AP) MLD. For example, the first non-AP STA affiliated with the non-AP MLD transmit a request for the transmission modes of the non-AP MLD. The first AP affiliated with the AP MLD transmits its transmission mode. When (or only when) the first non-AP STA affiliated with the non-AP MLD receives the transmission mode, the first non-AP STA affiliated with the non-AP MLD may feed back a confirmation for the reception of the transmission mode.

In one embodiment, the first non-AP STA affiliated with the non-AP MLD may receive a second frame from the first AP affiliated with the AP MLD, and then the non-AP MLD is operating in an enhanced multi-link (EML) mode one the links (e.g., EMLSR links or EMLMR links). The second frame includes second transmission mode information. The second transmission mode information indicates one of the transmission mode of the non-AP MLD. The second transmission mode information is an acknowledgment of the first transmission mode information. That is the first non-AP STA affiliated with the non-AP MLD directly solicits its transmission mode, and the first AP affiliated with the AP MLD may feed back an acknowledgment for the reception of the transmission mode of the non-AP MLD.

In one embodiment, the other non-AP STAs (e.g., the second non-AP STA or the third non-AP STA) affiliated with the non-AP MLD may wait, by the non-AP MLD, a transition delay, and then the non-AP MLD is operating in an EML mode one the links (e.g., EMLSR links or EMLMR links). In one embodiment, the transition delay may be indicated in the Transition Timeout subfield in the EML Capabilities subfield of the Basic Multi-Link element. The non-AP MLD may operate in the EMLSR/EMLMR mode after the transition delay.

In one embodiment, the non-AP MLD may support with EMLSR mode. For example, non-AP MLD that supports EMLSR operation sets the EMLSR Mode subfield of EML control filed format to 1, to indicate that the non-AP MLD operates in EMLSR mode. In one embodiment, the non-AP MLD may support with an enhanced multi-link multi-radio (EMLMR) mode. For example, non-AP MLD that supports EMLMR operation sets the EMLMR Mode subfield of EML control filed format to 1, to indicate that the non-AP MLD operates in EMLMR mode.

In one embodiment, the first frame and/or the second frame is used to solicit entering EMLSR mode. Furthermore, after the first frame is transmitted and/or the second frame is received, the non-AP MLD is operating in the EMLSR mode, and the AP MLD supports with the EMLSR mode.

In one embodiment, the first frame and/or the second frame is used to solicit entering an EMLMR mode. Furthermore, after the first frame is transmitted and/or the second frame is received, the non-AP MLD is operating in the EMLMR mode, and the AP MLD supports with the EMLMR mode.

In one embodiment, the non-AP MLD is configured with nonsimultaneous transmit and receive (NSTR) for its belonging links. In some embodiments, the non-AP MLD may be other MLDs providing multiple links. In one embodiment, an STA affiliated with an MLD may be an AP STA or a non-AP STA. It should be noticed that, in some embodiments, the non-AP STAs (e.g., the first non-AP STA, a second non-AP STA, or others) affiliated with the non-AP MLD may be called as STAs affiliated with the non-AP MLD. The AP STAs affiliated with an AP MLD are AP STAs. The non-AP STAs affiliated with the non-AP MLD may be operated at same or different frequency bands, for example, 2.4 GHz, 5 GHz, or 6 GHz.

In one embodiment, the frame in the frame exchange could be MAC frame, control frame, management and extension frame, or action frame. In one embodiment, the non-AP MLD makes frame exchange with an AP MLD. In one embodiment, the AP MLD supports with EMLSR mode. For example, an AP MLD with dot11EHTEMLSROptionImplemented equal to true that receives an EML Operating Mode Notification frame from a non-AP STA affiliated with a non-AP MLD sets the EMLSR Mode subfield of the EML Operating Mode Notification frame that is sent in response to the value (e.g., 1) obtained from the received EML Operating Mode Notification frame. In one embodiment, the AP MLD supports with EMLMR mode. For example, an AP MLD with dot11EHTEMLMROptionImplemented equal to true that receives an EML Operating Mode Notification frame from a non-AP STA affiliated with a non-AP MLD sets the EMLMR Mode subfield of the EML Operating Mode Notification frame that is sent in response to the value (e.g., 1) obtained from the received EML Operating Mode Notification frame.

In one embodiment, the links between the non-AP MLD and the AP MLD are EMLSR links. That is one non-AP STA affiliated with the non-AP MLD is operating on the EMLSR links. In one embodiment, the links between the non-AP MLD and the AP MLD are EMLMR links. That is one non-AP STA affiliated with the non-AP MLD is operating on the EMLMR links. In one embodiment, the links between the non-AP MLD and the AP MLD are nonsimultaneous transmit and receive (NSTR) links.

In one embodiment, the first transmission mode information indicates one of the transmission modes of the non-AP MLD. The transmission modes allow none, one, or more non-AP STAs affiliated with the non-AP MLD operating on one of links has a right to initiate a TXOP for frame exchange.

In one embodiment, the non-AP MLD may initiate the frame exchange on one of the links with an AP affiliated with an AP MLD according to the first transmission mode information. In another embodiment, the non-AP MLD may disable initiating the frame exchange on one of the links with an AP affiliated with an AP MLD according to the first transmission mode information. That is whether a frame exchange can be initiated on one link is determined according to the first transmission mode information.

For example, when a non-AP MLD is operating in the EMLSR mode with an AP MLD supporting the EMLSR mode, the operation of the non-AP MLD for initiating the frame exchange on one of the EMLSR links with AP MLD is divided into different EMLSR Uplink Transmission modes as follows.

In one embodiment, an initial control frame of the frame exchange initiated by the AP MLD on one of the links (e.g., EMLSR links or EMLMR links) is MU-RTS Trigger frame. In one embodiment, an initial control frame of the frame exchange initiated by the AP MLD on one of the links (e.g., EMLSR links or EMLMR links) is MU-RTS TXOP sharing (TXS) Trigger frame. For example, a non-AP MLD is operating in the EMLSR/EMLMR mode with an AP MLD supporting the EMLSR mode on the EMLSR/EMLMR links. After receiving the initial Control frame of a frame exchange (sequence), which is the MU-RTS TXS Trigger frame, the non-AP MLD shall be able to transmit or receive frames on the link in which the MU-RTS TXS Trigger frame was received and shall not transmit or receive on the other EMLSR/EMLMR link(s) until the end of the frame exchange sequence, and subject to its spatial stream capabilities, operation mode, and link switch delay, the non-AP MLD is capable of receiving a PPDU that is sent using more than one spatial stream or transmitting a PPDU using more than one spatial stream on the link in which the MU-RTS TXS Trigger frame was received a SIFS after the end of its response frame transmission solicited by the MU-RTS TXS Trigger frame.

In one embodiment, a first mode of the transmission modes indicates it is allowed that any one of the first non-AP STA and the second non-AP STA affiliated with the non-AP MLD has a right to initiate a TXOP for the frame exchange on one of the links and merely one of the first non-AP STA and the second non-AP STA affiliated with the non-AP MLD initiates the frame exchange on one of the links at a time. For example, in mode 1 of the uplink transmission mode, it is allowed that any STA affiliated (e.g., the first non-AP STA, the second non-AP STA, or others) with the non-AP MLD that is operating on one of the EMLSR links has the right to initiate a TXOP for frame exchange with the AP MLD, but only one STA affiliated with the non-AP MLD that is operating on one of the EMLSR links initiates frame exchanges with the AP MLD at a time.

In one embodiment, a second mode of the transmission mode indicates it is disallowed that the first non-AP STA and the second non-APSTA affiliated with the non-AP MLD initiates the frame exchange. For example, in mode 2 of the uplink transmission mode, it is disallowed that any STA affiliated with the non-AP MLD that is operating on one of the EMLSR links initiates frame exchanges with the AP MLD. That is, any STA affiliated with the non-AP MLD disables initiating the frame exchanges on any one of the EMLSR links.

In one embodiment, a third mode of the transmission mode indicates it is allowed at least one of the first non-AP STA and the second non-AP STA has a right to initiate a TXOP for the frame exchange on a subset of the links and merely one of the first non-AP STA and the second non-AP STA affiliated with the non-AP MLD initiates the frame exchange on one of the links at a time. For example, in mode 3 of the uplink transmission mode, it is allowed that one or more of STAs affiliated with the non-AP MLD that are operating on the specific subset of the EMLSR links have the right to initiate a TXOP for frame exchange with the AP MLD, but only one STA affiliated with the non-AP MLD that is operating on one of the EMLSR links initiates frame exchanges with the AP MLD at a time.

In one embodiment, the first transmission mode information and/or the second transmission mode information related to the transmission mode may be specified in an uplink transmission mode subfield. The uplink transmission is a transmission from a non-AP STA affiliated with a non-AP MLD to an AP affiliated with an AP MLD. In one embodiment, the uplink transmission mode subfield may be indicated in an enhanced multiple link (EML) Control field. In one embodiment, the links corresponding to the first transmission mode information and/or the second transmission mode information may be specified in an allowed link bitmap subfield. In one embodiment, the first transmission mode information and/or the second transmission mode information related to the transmission mode may be specified in an EML Operating Mode Notification frame. However, the first transmission mode information and/or the second transmission mode information may be specified in other subfields, fields, or frames.

In one embodiment, the subset of the links indicated by the third transmission mode is specified in an allowed link bitmap subfield. In one embodiment, the allowed link bitmap subfield is indicated in an EML Control field. In one embodiment, the subset of the links indicates one or more link identifiers (IDs) corresponding to one or more links between the non-AP MLD and AP MLD. In one embodiment, the subset of the links may be specified in an EML Operating Mode Notification frame. However, the subset of the links may be specified in other subfields, fields, or frames.

Figure 2:
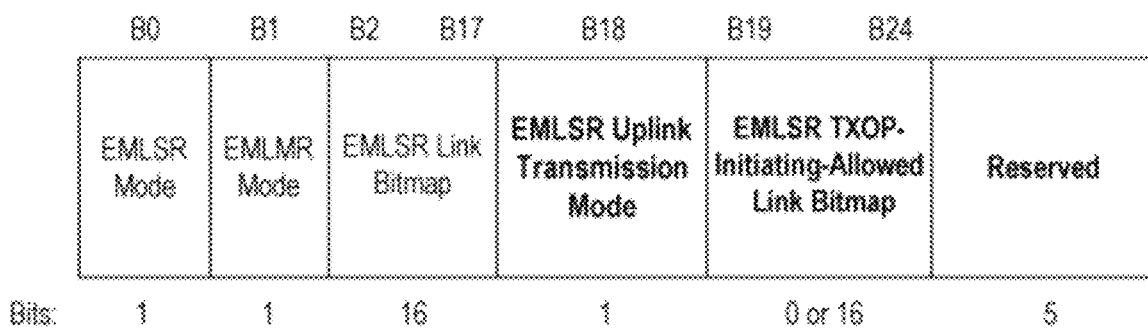
FIG. 2 is a schematic diagram of enhanced multi-link (EML) Control field according to an exemplary embodiment of the present disclosure.

For example, FIG. 2 is a schematic diagram of EML Control field according to an exemplary embodiment of the present disclosure. Referring to FIG. 2, the EML Control field may include EMLSR mode subfield, enhanced multi-link multi-radio (EMLMR) subfield, EMLSR link bitmap subfield, EMLSR Uplink Transmission Mode subfield, and EMLSR TXOP-Initiating-Allowed Link Bitmap subfield. A non-AP MLD that supports EMLSR operation sets the EMLSR Mode subfield to 1 to indicate that the non-AP MLD operates in EMLSR mode and to 0 to indicate that the non-AP MLD does not operate in EMLSR mode. A non-AP MLD that supports EMLMR operation sets the EMLMR Mode subfield to 1 to indicate that the non-AP MLD operates in EMLMR mode and to 0 to indicate that the non-AP MLD does not operate in EMLMR mode. The EMLSR Link Bitmap subfield indicates the subset of the enabled links that is used by the non-AP MLD in the EMLSR mode. The bit position i of the EMLSR Link Bitmap subfield corresponds to the link with the Link ID equal to i and is set to 1 to indicate that the link is used by the non-AP MLD for the EMLSR mode and is a member of the EMLSR links; otherwise, the bit position is set to 0.

The EMLSR Uplink Transmission Mode subfield indicates the uplink transmission mode for the EMLSR links as the table (1):

TABLE 1

| EMLSR Uplink Transmission Mode subfield value | Description |
| --- | --- |
| 0 | It is allowed that any STA affiliated with the non-AP MLD that is operating on one of the EMLSR links has the right to initiate a TXOP for frame exchange with the AP MLD, but only one STA affiliated with the non-AP MLD that is operating on one of the EMLSR links initiates frame exchanges with the AP MLD at a time. |
| 1 | It is disallowed that any STA affiliated with the non-AP MLD that is operating on one of the EMLSR links initiates frame exchanges with the AP MLD. |
| 2 | It is allowed that one or more of STAs affiliated with the non-AP MLD that are operating on the specific subset of the EMLSR links have the right to initiate a TXOP for frame exchange with the AP MLD, but only one STA affiliated with the non-AP MLD that is operating on one of the EMLSR links initiates frame exchanges with the AP MLD at a time. |
| 3 | Reserved |

It should be noticed that the EMLSR Uplink Transmission Mode subfield value corresponding one transmission mode may be adjusted based on the actual requirement.

The EMLSR TXOP-Initiating-Allowed Link Bitmap subfield indicates the subset of the EMLSR links that is used by the non-AP MLD and allowed for initiating a TXOP for uplink transmission in the EMLSR mode. The bit position i of the EMLSR TXOP-Initiating-Allowed Link Bitmap subfield corresponds to the link with the Link ID equal to i and is set to 1 to indicate that the link is used by the non-AP MLD and allowed for initiating a TXOP for uplink transmission for the EMLSR mode and is a member of the EMLSR links; otherwise, the bit position is set to 0. For example, "0111000000000000" is set in EMLSR TXOP-Initiating-Allowed Link Bitmap subfield. It means that Link IDs 1, 2, and 3 are allowed for initiating a TXOP for uplink transmission for the EMLSR mode and is the EMLSR links.

Figure 3:
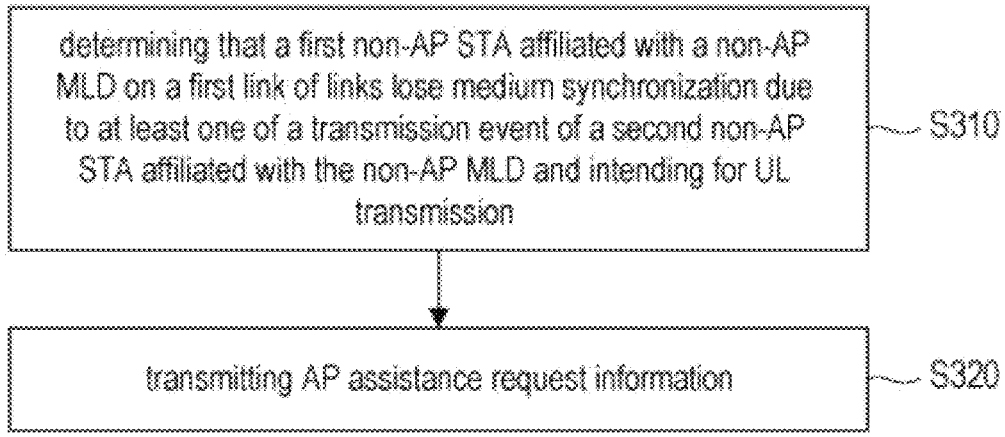
FIG. 3 is a flowchart of a data transmission method according to an exemplary embodiment of the present disclosure.

FIG. 3 is a flowchart of a data transmission method according to an exemplary embodiment of the present disclosure. Referring to FIG. 3, a non-AP MLD or an AP MLD determine that a first non-access point (non-AP) station (STA) affiliated with a non-AP multi-link device (MLD) on a first link of links loses medium synchronization due to a transmission event of a second non-AP STA affiliated with the non-AP MLD or the first non-AP STA affiliated with the non-AP MLD intends for UL transmission (step S310). The transmission event could be one or more frame exchanges.

In one embodiment, the non-AP MLD may support with EMLSR mode. In one embodiment, the non-AP MLD may support with EMLMR mode. In one embodiment, the non-AP MLD is configured with NSTR for its belonging links. In some embodiments, the non-AP MLD may be other MLDs providing multiple links. In one embodiment, an STA affiliated with an MLD may be an AP STA or a non-AP STA. It should be noticed that, in some embodiments, the non-AP STAs (e.g., the third non-AP STA, a fourth non-AP STA, or others) affiliated with the non-AP MLD may be called as STAs affiliated with the non-AP MLD. The AP STAs affiliated with an AP MLD are AP STAs. The non-AP STAs affiliated with the non-AP MLD may be operated at same or different frequency bands, for example, 2.4 GHz, 5 GHz, or 6 GHz.

In one embodiment, the frame in the frame exchange could be MAC frame, control frame, management and extension frame, or action frame. In one embodiment, the non-AP MLD makes frame exchange with an AP MLD. In one embodiment, the AP MLD supports with EMLSR mode. In one embodiment, the AP MLD supports with EMLSR mode.

In one embodiment, the links between the non-AP MLD and the AP MLD are EMLSR links. In one embodiment, the links between the non-AP MLD and the AP MLD are EMLMR links. In one embodiment, the links between the non-AP MLD and the AP MLD are NSTR links.

A second non-AP STA affiliated with the non-AP MLD transmit access point (AP) assistance request information on a second link of the links (step S320). The AP assistance request information being used to solicit an assisting AP affiliated (e.g., the second AP or the third AP) with an AP MLD to assist the first non-AP STA affiliated with the non-AP MLD operating on the first link to recover the medium synchronization or to trigger the UL transmission.

In AP assistance request (AAR) medium synchronization recovery procedure, a non-AP STA (e.g., the first non-AP STA) affiliated with a non-AP MLD with dot11AAROptionImplemented equals to true and that belongs to an NSTR link pair may transmit the AAR Control subfield in a frame to its associated AP (e.g., a first AP) affiliated with an AP MLD if it has received a Basic Multi-Link element from the AP with the AAR Support subfield equal to 1. The AAR Control subfield transmitted by a non-AP STA (e.g., the first non-AP STA) affiliated with a non-AP MLD carries the link identifier of another AP affiliated (e.g., a second AP or a third AP) with the same AP MLD to solicit the other AP to transmit a Trigger frame to the other non-AP STA affiliated with the same non-AP MLD that belongs to the same NSTR link pair.

In one embodiment, the AP assistance request information transmitted by the second non-AP STA affiliated with the non-AP MLD to the second AP affiliated with the AP MLD is the AAR Control subfield. For example, when a non-AP MLD is operating in the EMLSR mode with an AP MLD supporting the EMLSR mode, a non-AP STA (e.g., the second non-AP STA) affiliated with the non-AP MLD that belongs to the (EMLSR) links transmits a frame with an AAR Control subfield that solicits an immediate response to its associated AP (e.g., the second AP) affiliated with an AP MLD if one or more of the other STAs (e.g., the first non-AP STA, the third non-AP STA, etc.) operating on the other (EMLSR) links need assistance in transmitting frames (i.e., the transmission) to its associated AP (e.g., the first AP, the third AP, etc.).

In one embodiment, other non-AP STAs (e.g., the first non-AP STA, the third non-AP STA, etc.) affiliated with the non-AP MLD may receive a trigger frame from an assisting AP (e.g., the first STA, the third STA, etc.) affiliated with the AP MLD. The trigger frame indicates a TXOP to which a frame with the AP assistance request information (e.g., an AAR Control subfield) belongs. In one embodiment, the trigger frame is a multi-user request to send (MU-RTS) trigger frame or a buffer status report poll (BSRP) trigger frame. When (or only when) a received trigger frame is not the MU-RTS trigger frame or the BSRP trigger frame, the other non-AP STAs (e.g., the first non-AP STA, the third non-AP STA, etc.) affiliated with the non-AP MLD may ignore the received trigger frame. In one embodiment, the trigger frame is received by an assisted non-AP STA affiliated with the non-AP MLD or transmitted by an assisting AP affiliated with the AP MLD in an orthogonal frequency division multiple (OFDM) physical layer (PHY) protocol data unit (PPDU) or non-high throughput (non-HT) duplicate PPDU format using a rate of 6 Mbps, 12 Mbps, or 24 Mbps. However, the trigger frame could be other frame formats or carried by other data units.

In one embodiment, the AP assistance request information may further indicate a link identifier of merely one assisting AP affiliated with the AP MLD that belongs to one of the links. It means that the merely one assisting AP is allowed to assist its assisted non-AP STA for the transmission. For example, the AP assistance request information indicates the link ID of the second AP affiliated with the AP MLD.

In one embodiment, the AP assistance request information may further indicate multiple link identifiers of multiple assisting APs affiliated with the AP MLD that belong to more than one of the links. It means that more than one assisting AP is allowed to assist their assisted non-AP STAs for the transmission. For example, the AP assistance request information indicates the link ID of the second AP and third AP affiliated with the AP MLD.

In one embodiment, other non-AP STAs (e.g., the first non-AP STA, the third non-AP STA, etc.) affiliated with the non-AP MLD may receive a trigger frame from an assisting AP (e.g., the first AP, the third AP, etc.) affiliated with the AP MLD. The trigger frame indicates a TXOP to which a frame with the AP assistance request information belongs.

In one embodiment, other non-AP STAs (e.g., the first non-AP STA, the third non-AP STA, etc.) affiliated with the non-AP MLD may receive a trigger frame from an assisting AP (e.g., the first AP, the third AP, etc.) affiliated with the AP MLD to solicit a frame response.

In one embodiment, other non-AP STAs (e.g., the first non-AP STA, the third non-AP STA, etc.) affiliated with the non-AP MLD may receive a trigger frame from an assisting AP (e.g., the first AP, the third AP, etc.) affiliated with the AP MLD. The trigger frame indicates a time duration allocated to the first non-AP STA within the TXOP obtained by the assisted AP affiliated with the AP MLD.

In one embodiment, other non-AP STAs (e.g., the first non-AP STA, the third non-AP STA, etc.) affiliated with the non-AP MLD may receive a trigger frame from an assisting AP (e.g., the first AP, the third AP, etc.) affiliated with the AP MLD to solicit an UL physical layer (PHY) protocol data unit (PPDU).

In one embodiment, other non-AP STAs (e.g., the first non-AP STA, the third non-AP STA, etc.) affiliated with the non-AP MLD may receive a trigger frame from an assisting AP (e.g., the first AP, the third AP, etc.) affiliated with the AP MLD within a response timeout interval. The trigger frame indicates to solicit a transmission on the first link associated with the first non-AP STA affiliated with the non-AP MLD, and the AP assistance request information includes the response timeout interval used for a response from the assisting AP affiliated with an AP MLD.

In one embodiment, the first non-AP STA affiliated with the non-AP MLD may determine the AP assistance request information being outdated when the response timeout interval expires. For example, the AP assistance request information is received after the response timeout interval, the first non-AP STA affiliated with the non-AP MLD may consider the AP assistance request information is unavailable or should be updated. In one embodiment, the second AP affiliated with the AP MLD may disable transmitting the trigger frame when the response timeout interval expires. That is when (or only when) the second AP affiliated with the AP MLD can not transmit a trigger frame within the response timeout interval, there is no need to transmit the trigger frame at the time after the response timeout interval.

In one embodiment, the response timeout interval is a timeout value for transmitting the trigger frame by the assisting AP (e.g., the first AP or the third AP) affiliated with the AP MLD as a response to a frame with the AP assistance request information (e.g., an AAR Control subfield). For example, if the trigger frame is received within the response timeout interval after the (EMLSR) Transition Delay following the end of the frame exchanges (e.g., the transmission of the first non-AP affiliated with the non-AP MLD with the first AP affiliated with the AP MLD) or the TXOP to which the frame with the AAR Control subfield (i.e., the AP assistance request information) belongs, the received trigger frame is acceptable. However, if the trigger frame is not received within the response timeout interval, the trigger frame would be rejected or ignored.

In one embodiment, the trigger frame is received by the other non-AP STA (e.g., the first non-AP STA or the third non-AP STA) affiliated with the non-AP MLD after a transition delay following an end of the transmission (e.g., frame exchange) between the second non-AP STA affiliated with the non-AP MLD and an AP (e.g., the second AP) affiliated with the AP MLD or a TXOP to which a frame with the AP assistance request information belongs. The transition is a non-AP STA affiliated with a non-AP MLD transit from a doze state to an awake state for the transmission.

For example, the assisting AP may transmit a trigger frame to the assisted STA affiliated with the non-AP MLD that belongs to the EMLSR links to solicit an UL frame after EMLSR Transition Delay following the end of the frame exchanges or the TXOP to which the frame with the AAR Control subfield belongs and/or within the timeout interval indicated in the Response Timeout subfield in the AAR Control subfield (i.e., the AP assistance request information) if the AP affiliated with the same AP MLD successfully received the frame with the AAR Control subfield and the assisting AP does not have frame exchanges already scheduled with another STA. The assisted STA is the STA affiliated with the same non-AP MLD as the STA sending the AAR control subfield and associated with the assisting AP.

In one embodiment, the response timeout interval is specified in a Response Timeout subfield in an AP assistance request (AAR) Control subfield, and the AP assistance request information is the AAR Control subfield.

Figure 4:
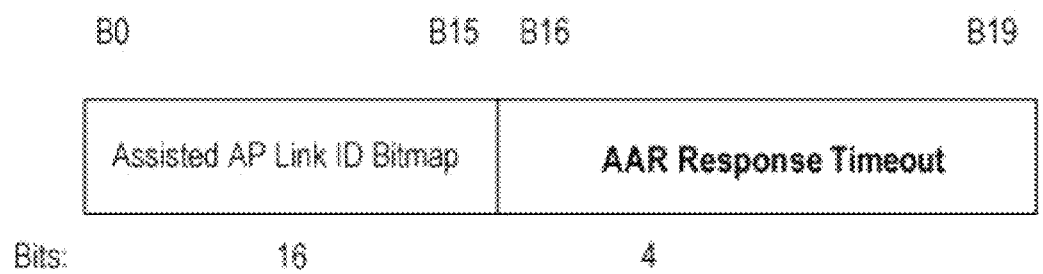
FIG. 4 is a schematic diagram of control information subfield format in an AP assistance request (AAR) Control subfield according to an exemplary embodiment of the present disclosure.

For example, FIG. 4 is a schematic diagram of control information subfield format in an AP assistance request (AAR) Control subfield according to an exemplary embodiment of the present disclosure. Referring to FIG. 4, the Control Information subfield in an AAR Control subfield contains information related to the procedure that allows an AP affiliated with an AP MLD to assist a non-AP STA affiliated with a non-AP MLD that belongs to an NSTR link pair or EMLSR links to recover its medium synchronization.

The AAR Control subfield may include an assisted AP Link ID bitmap subfield and an AAR Response Timeout subfield.

The Assisted AP Link ID Bitmap subfield indicates the link identifier(s) of an AP affiliated with an AP MLD that is solicited to transmit a Trigger frame to a non-AP STA affiliated with a non-AP MLD that belongs to an NSTR link pair after a frame that contains AAR Control subfield sent by another non-AP STA affiliated with the same non-AP MLD to its associated AP affiliated with the same AP MLD. A value of 1 in bit position i of the Assisted AP Link ID Bitmap subfield means that the link ID i is the link identifier of the solicited AP affiliated with the AP MLD. A value of 0 in bit position i of the Assisted AP Link ID Bitmap subfield means that the link ID i is not the link identifier of the solicited AP affiliated with the AP MLD.

The AAR Response Timeout subfield indicates the response timeout value for the transmission of the Trigger frame by the assisting APs affiliated with an AP MLD as a response to a frame with an AAR Control subfield (i.e., the AP assistance request information) after an AP affiliated with the AP MLD receives the frame with the AAR Control subfield.

In one embodiment, when an assisting AP (e.g., the first AP) affiliated with the AP MLD has transmitted the trigger frame, the other assisting AP(s) (e.g., the third AP, or a fourth AP) affiliated with the same AP MLD may disable transmitting a trigger frame to its assisted non-AP STA affiliated with the non-AP MLD that belongs to the links. For example, if an assisting AP has transmitted a Trigger frame to the assisted STA affiliated with the non-AP MLD that belongs to the EMLSR links or NSTR link pair after EMLSR Transition Delay following the end of the frame exchanges or the TXOP to which the frame with the AAR Control subfield (i.e., the AP assistance request information) belongs, the other assisting APs that belong to the other EMLSR links or NSTR link pair indicated in the AAR Control subfield if present may not transmit a Trigger frame to its assisted STA affiliated with the non-AP MLD that belongs to the EMLSR links or NSTR link pair.

In one embodiment, when an assisting AP (e.g., the first AP) affiliated with the AP MLD has transmitted the trigger frame and received a response (e.g., a clear to send (CTS) frame) to the trigger frame, the other assisting AP(s) (e.g., the third AP, or a fourth AP) affiliated with the same AP MLD may disable transmitting a trigger frame to its assisted non-AP STA affiliated with the non-AP MLD that belongs to the links. For example, if an assisting AP has transmitted a Trigger frame to the assisted STA affiliated with the non-AP MLD that belongs to the EMLSR links or NSTR link pair and then receive a response to the Trigger frame from the assisted STA, the other assisting AP that belongs to the other EMLSR links or NSTR link pair indicated in the AAR Control subfield if present may not transmit a Trigger frame to its assisted STA affiliated with the non-AP MLD that belongs to the EMLSR links or NSTR link pair.

Figure 5:
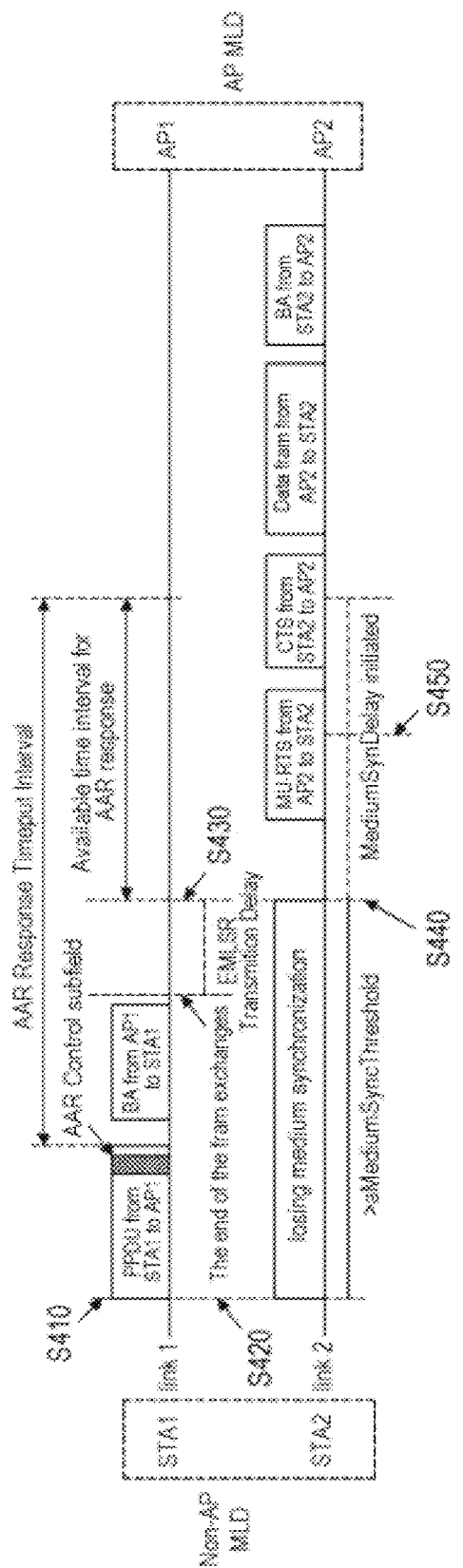
FIG. 5 is a schematic diagram of AAR response timeout according to an exemplary embodiment of the present disclosure.

FIG. 5 is a schematic diagram of AAR response timeout according to an exemplary embodiment of the present disclosure. Referring to FIG. 5, a non-AP MLD is operating in the EMLSR mode with an AP MLD supporting the EMLSR mode and its EMLSR links are Link 1 an 2. When non-AP STA STA1 affiliated with the non-AP MLD and operating on Link 1 initiates a transmission sequence in a TXOP (step S410), a frame with an AAR Control subfield is carried in a PPDU from non-AP STA STA1 to AP STA AP1 and the AAR Control subfield indicates a response timeout value (i.e., AAR Response Timeout Interval in the drawing) for the transmission of a Trigger frame by AP STA AP2 affiliated with the AP MLD as a response to the AAR Control subfield. Furthermore, non-AP STA STA2 affiliated with the non-AP MLD may switch from the listening operation (step S420) and lose medium synchronization on Link 2 within aMediumSyncThreshold. The AP STA AP1 affiliated with the AP MLD receives the AAR control subfield and further transmits a block acknowledgment (BA) to the non-AP STA STA1 affiliated with the non-AP MLD on Link 1. The available time interval for the AAR response is from the time that the non-AP STA STA2 affiliated with the non-AP MLD switches back to the listening operation to the AAR Response Timeout interval following the transmission of the PPDU carrying the AAR Control subfield (step S430) and starts a MediumSyncDelay timer (step S440). The AP STA AP2 transmits a MU-RTS Trigger frame to non-AP STA STA2 to solicit an UL frame as a response to the AAR Control subfield in the available time interval for the AAR response, and the MediumSyncDelay timer resets to zero (step S450). If the AP STA AP2 receives a clear to send (CTS) frame from the non-AP STA STA2, the AP STA AP2 would assist to transmit the data frame to the non-AP STA STA2.

Figure 6:
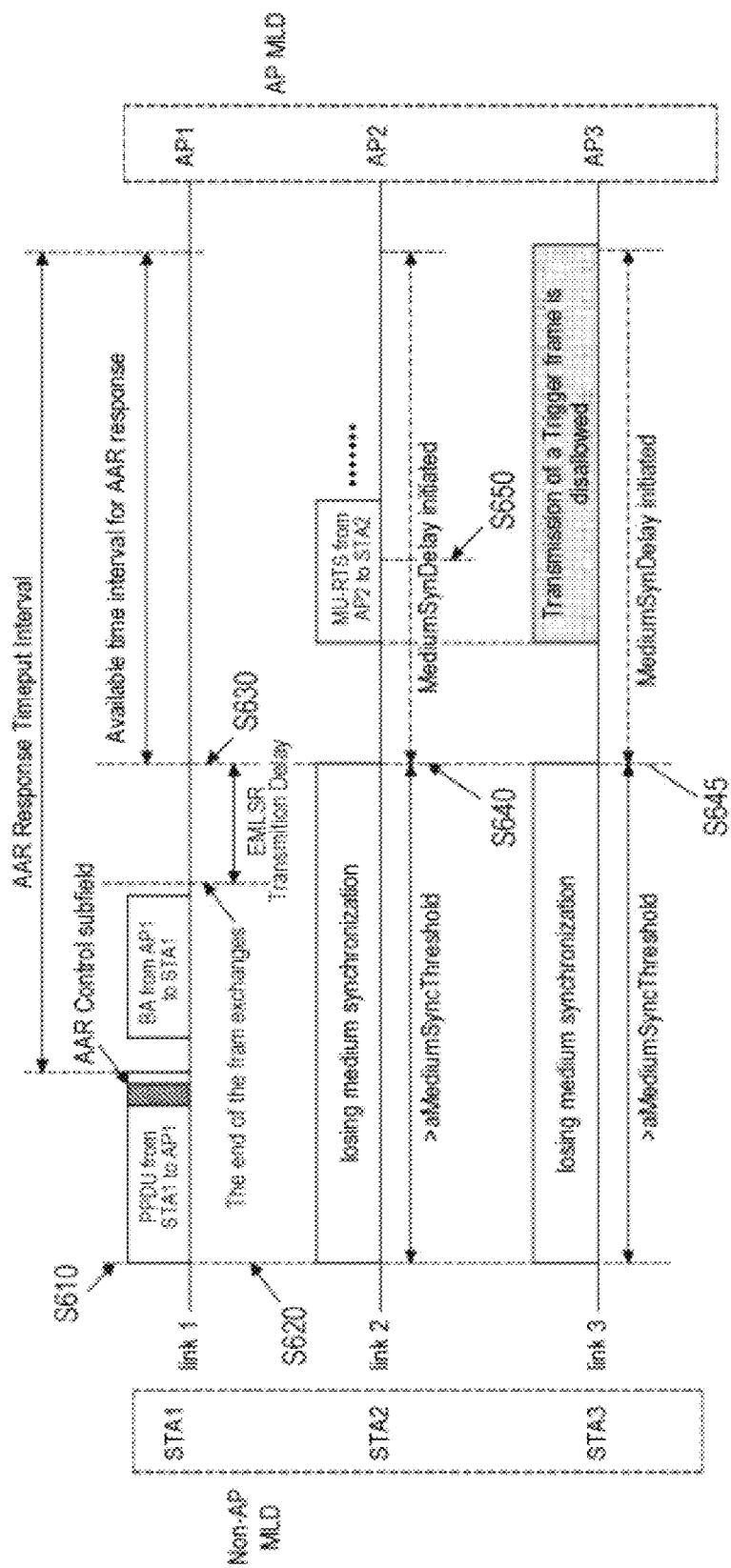
FIG. 6 is a schematic diagram of AAR with multiple assisting APs according to an exemplary embodiment of the present disclosure.

FIG. 6 is a schematic diagram of AAR with multiple assisting APs according to an exemplary embodiment of the present disclosure. Referring to FIG. 6, the difference between FIG. 5 and FIG. 6 is that in FIG. 6, a non-AP MLD is operating in the EMLSR mode with an AP MLD supporting the EMLSR mode and its EMLSR links are Link 1, Link 2, and Link 3. The AAR Control subfield transmitted by the STA indicates the link identifier(s) of one or more assisting APs affiliated with the same AP MLD that belongs to the other EMLSR links by setting the corresponding bits to 1. In this embodiment, Link 2 and Link 3 are indicated by AAR Control subfield. When the non-AP STA STA1 affiliated with the non-AP MLD and operating on Link 1 initiates a transmission sequence in a TXOP (step S610), a frame with an AAR Control subfield is carried in a PPDU from STA1 to AP1 and the AAR Control subfield indicates a timeout value for the transmission of a Trigger frame by AP STAs AP2 and AP3 affiliated with an AP MLD as a response to the AAR Control subfield. The non-AP STAs STA2 and STA3 affiliated with the non-AP MLD may switch from the listening operation (step S620) and lose medium synchronization on Link 2 and Link 3 within aMediumSyncThreshold. The AP STA AP1 affiliated with the AP MLD receives the AAR control subfield and further transmits a block acknowledgment (BA) to the non-AP STA STA1 affiliated with the non-AP MLD on Link 1. The available time interval for the AAR response is from the time that the non-AP STA STA2 or STA3 switches back to the listening operation (step S630) to the time that is the end of the AAR Response Timeout interval, where the AAR Response Timeout interval has a start following the end time of the transmission of the PPDU with the frame carrying the AAR Control subfield. Each one of the non-AP STA STA2 and STA3 starts a MediumSyncDelay timer (step S640 or S645). The AP STA AP2 transmits an MU-RTS Trigger frame to the non-AP STA STA2 to solicit an UL frame as a response to the AAR Control subfield in the available time interval for the AAR response (step S650). Therefore, the non-AP STA AP3 is disallowed to transmit a Trigger frame to the non-AP STA STA3 in the available time interval after the AP STA AP2 transmits an MU-RTS Trigger frame to the non-AP STA STA2.

Figure 7:
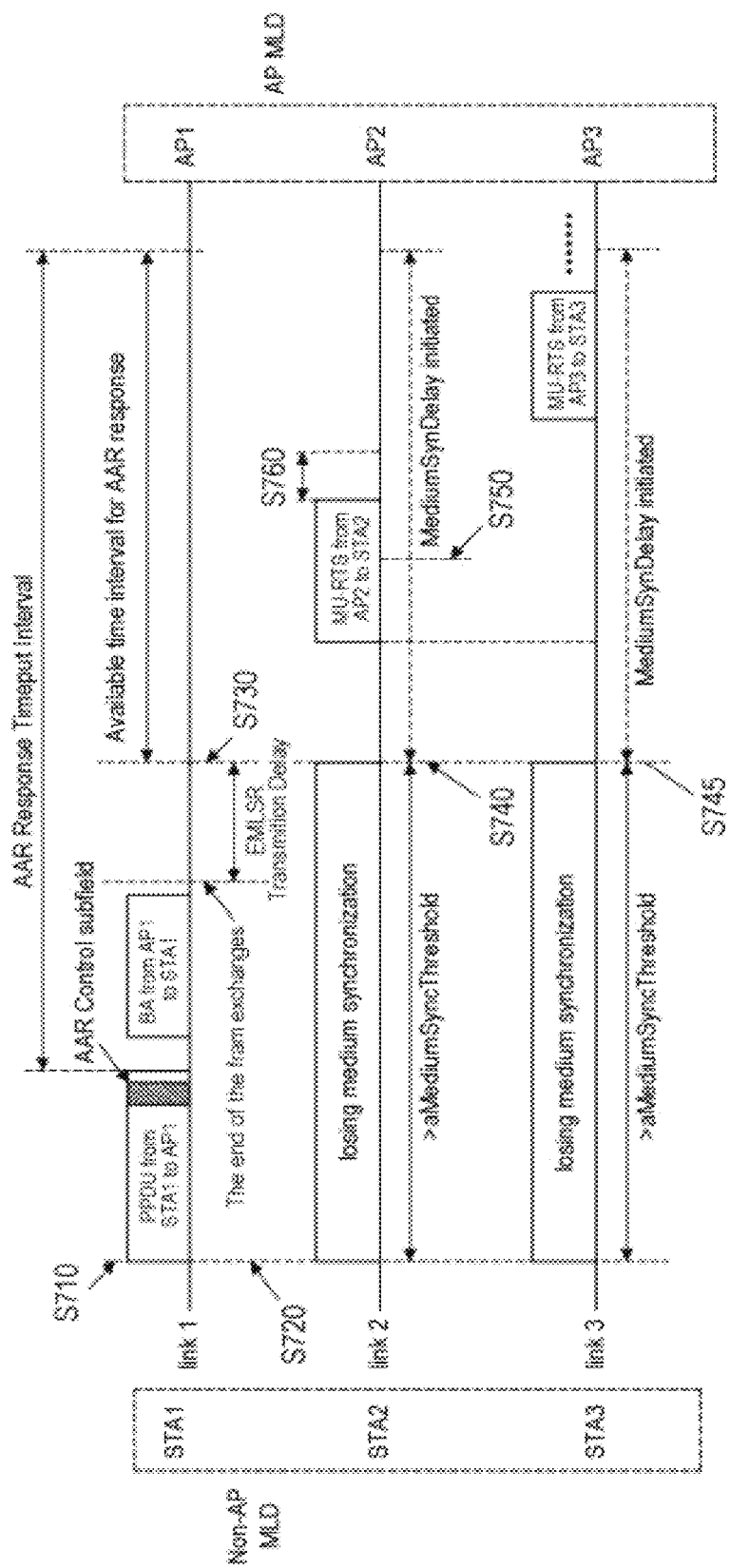
FIG. 7 is a schematic diagram of AAR with multiple assisting APs according to an exemplary embodiment of the present disclosure.

FIG. 7 is a schematic diagram of AAR with multiple assisting APs according to an exemplary embodiment of the present disclosure. Referring to FIG. 7, the difference between FIG. 5 and FIG. 7 is that in FIG. 7, a non-AP MLD is operating in the EMLSR mode with an AP MLD supporting the EMLSR mode and its EMLSR links are Link1, Link2, and Link3. When the non-AP STA STA1 affiliated with the non-AP MLD and operating on Link 1 initiates a transmission sequence in a TXOP (step S710), a frame with an AAR control subfield is carried in a PPDU from STA1 to AP1 and the AAR Control subfield indicates a timeout value for the transmission of a Tigger frame by the AP STAs AP2 and AP3 affiliated with an AP MLD as a response to the AAR Control subfield. The non-AP STAs STA2 and STA3 affiliated with the non-AP MLD may switch from the listening operation (step S720) and lose medium synchronization on Link 2 and Link 3 within aMediumSyncThreshold. The AP STA AP1 affiliated with the AP MLD receives the AAR control subfield and further transmits a block acknowledgment (BA) to the non-AP STA STA1 affiliated with the non-AP MLD on Link 1. The available time interval for the AAR response is from the time that the non-AP STA STA2 or STA3 switches back to the listening operation (step S730) to the time that is the end of the AAR Response Timeout interval, where the AAR Response Timeout interval has a start following the end time of the transmission of the PPDU with the frame carrying the AAR Control subfield. Each one of the non-AP STA STA2 and STA3 starts a MediumSyncDelay timer (step S740 or S745). The AP STA AP2 transmits an MU-RTS Trigger frame to the non-AP STA STA2 to solicit an UL frame as a response to the AAR Control subfield in the available time interval for the AAR response, but doesn't receive a CTS frame from non-AP STA STA2 within an interval (such as aSIFSTime+a SlotTime+aRxPHYStartDelay) (step S760). The AP STA AP3 transmits an MU-RTS Trigger frame to the non-AP STA STA3 in the available time interval after knowing that the transmission initiated by the AP STA AP2 fails.

Figure 8:
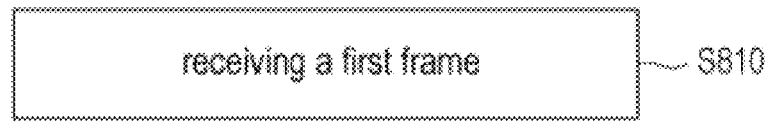
FIG. 8 is a flowchart of a data transmission method according to an exemplary embodiment of the present disclosure.

FIG. 8 is a flowchart of a data transmission method according to an exemplary embodiment of the present disclosure. Referring to FIG. 8, a first AP affiliated with an AP MLD receives a first frame from a first non-AP STA affiliated with a non-AP MLD (step S810). The first frame includes transmission mode information related to one of transmission modes of a non-AP MLD. The transmission modes allow none or at least one of a first non-AP station (STA) and a second non-AP STA affiliated with the non-AP MLD operating on one of links has a right to initiate a transmission opportunity (TXOP) for frame exchange. The detailed description of step S810 could be referred to FIG. 1-FIG. 7 and would be omitted.

In one embodiment, the first AP affiliated with the AP MLD may transmit a second frame to the first non-AP STA affiliated with the non-AP MLD. The second frame includes second transmission mode information. The second transmission mode information indicates the transmission modes of the non-AP MLD, and the second transmission mode information is an acknowledgment of the first transmission mode information.

In one embodiment, the second transmission mode information is a response of a request of the transmission modes, and the response is sent by the AP MLD.

In one embodiment, the AP MLD may initiate the frame exchange on one of links with the non-AP MLD according to the first transmission mode information.

In one embodiment, the AP MLD may disable initiating the frame exchange on one of links with the non-AP MLD according to the first transmission mode information.

In one embodiment, a first mode of the transmission modes indicates it is allowed that any one of a first non-AP station (STA) and a second non-AP STA affiliated with the non-AP MLD has a right to initiate a transmission opportunity (TXOP) for the frame exchange on one of the links and merely one of the first non-AP STA and the second non-AP STA affiliated with the non-AP MLD initiates the frame exchange on one of the links at a time.

In one embodiment, a second mode of the transmission mode indicates it is disallowed that a first non-AP STA and a second non-APSTA affiliated with the non-AP MLD initiate the frame exchange.

In one embodiment, a third mode of the transmission mode indicates it is allowed at least one of a first non-AP STA and a second non-AP STA has a right to initiate a TXOP for the transmission on a subset of the links and merely one of the first non-AP STA and the second non-AP STA affiliated with the non-AP MLD initiates the frame exchange on one of the links at a time.

In one embodiment, the first and/or second transmission mode information is specified in an uplink transmission mode subfield.

In one embodiment, the uplink transmission mode subfield is indicated in an enhanced multiple link (EML) Control field.

In one embodiment, the subset of the links is specified in an allowed link bitmap subfield.

In one embodiment, the links corresponding to the first and/or second transmission mode information is specified in an allowed link bitmap subfield.

In one embodiment, the allowed link bitmap subfield is indicated in an EML Control field.

In one embodiment, an initial control frame of the frame exchange initiated by the AP MLD on one of the links is MU-RTS Trigger frame.

In one embodiment, an initial control frame of the frame exchange initiated by the AP MLD on one of the links is MU-RTS TXOP sharing (TXS) Trigger frame.

In one embodiment, after the first frame is received, the non-AP MLD is operating in an EMLSR mode, and the AP MLD supports with EMLSR mode.

In one embodiment, after the first frame is received, the non-AP MLD is operating in an EMLMR mode, and the AP MLD supports with EMLMR mode.

In one embodiment, the links are EMLSR links operated by the AP MLD.

In one embodiment, the links are EMLMR links operated by the AP MLD.

Figure 9:
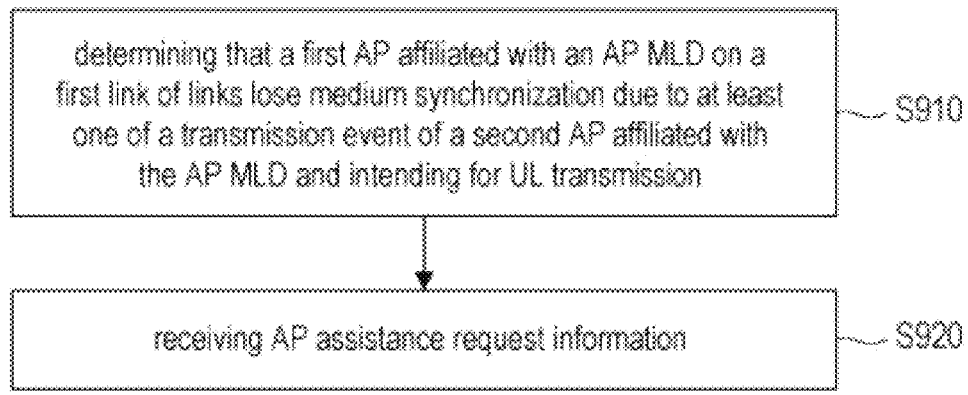
FIG. 9 is a flowchart of a data transmission method according to an exemplary embodiment of the present disclosure.

FIG. 9 is a flowchart of a data transmission method according to an exemplary embodiment of the present disclosure. Referring to FIG. 9, an AP MLD or a non-AP MLD determine that a first AP affiliated with the AP MLD on a first link of links loses medium synchronization due to a transmission event of a second AP affiliated with the AP MLD or the first AP affiliated with AP MLD intends for UL transmission (step S910). A second AP affiliated with the AP MLD receives AP assistance request information on a second link of the links (step S920). The AP assistance request information is used to solicit the first AP affiliated with the AP MLD to assist a non-AP station (STA) affiliated with a non-AP MLD operating on the first link to the recover medium synchronization or to trigger the UL transmission. The detailed description of steps S910-S920 could be referred to FIG. 1-FIG. 8 and would be omitted.

In one embodiment, the AP assistance request information indicates a link identifier of merely one assisting AP affiliated with the AP MLD that belongs to one of the links.

In one embodiment, the AP assistance request information indicates multiple link identifiers of multiple assisting APs affiliated with the AP MLD that belong to more than one of the links.

In one embodiment, the first AP affiliated with the AP MLD may transmit a trigger frame to solicit a frame response.

In one embodiment, the first AP affiliated with the AP MLD may transmit a trigger frame, and the trigger frame indicates a time duration allocated to the first non-AP STA within a TXOP obtained by the assisting AP affiliated with the AP MLD.

In one embodiment, the first AP affiliated with the AP MLD may transmit a trigger frame, and the trigger frame indicates a TXOP to which a frame with the AP assistance request information belongs.

In one embodiment, the first AP affiliated with the AP MLD may transmit a trigger frame to solicit an UL PPDU.

In one embodiment, the first AP affiliated with the AP MLD may transmit a trigger frame within a response timeout interval. The trigger frame indicates to solicit a transmission on the first link associated with the first AP affiliated with the non-AP MLD, and the AP assistance request information includes the response timeout interval used for a response from the first AP affiliated with the AP MLD.

In one embodiment, the first AP affiliated with the AP MLD may disable transmitting the trigger frame when the response timeout interval expires.

In one embodiment, a third AP affiliated with the AP MLD may disable transmitting the trigger frame when the second AP affiliated with the AP MLD has transmitted the trigger frame.

In one embodiment, a third AP affiliated with the AP MLD may disable transmitting the trigger frame when the second AP affiliated with the AP MLD has transmitted the trigger frame and received a response to the trigger frame.

In one embodiment, the response timeout interval is specified in a Response Timeout subfield in an AP assistance request (AAR) Control subfield, and the AP assistance request information is the AAR Control subfield.

In one embodiment, the trigger frame is a multi-user request to send (MU-RTS) trigger frame or a buffer status report poll (BSRP) trigger frame.

In one embodiment, the trigger frame is transmitted in an orthogonal frequency division multiple (OFDM) physical layer (PHY) protocol data unit (PPDU) or non-high throughput (non-HT) duplicate PPDU format using a rate of 6 Mbps, 12 Mbps, or 24 Mbps.

In one embodiment, the response timeout interval is a timeout value for transmitting the trigger frame by the second AP affiliated with the AP MLD as a response to a frame with the AP assistance request information.

In one embodiment, the trigger frame is transmitted after a transition delay following an end of the transmission between the second AP affiliated with the AP MLD and another non-AP STA affiliated with the non-AP MLD or a TXOP to which a frame with the AP assistance request information belongs.

In one embodiment, after a frame relating to soliciting an enhanced multi-link single radio (EMLSR) mode is transmitted, the non-AP MLD is operating in the EMLSR mode, and the AP MLD supports with the EMLSR mode.

In one embodiment, after a frame relating to soliciting an enhanced multi-link multi-radio (EMLMR) mode is transmitted, the non-AP MLD is operating in the EMLMR mode, and the AP MLD supports with the EMLMR mode.

In one embodiment, the links are EMLSR links.

In one embodiment, the links are EMLMR links.

In one embodiment, the links are nonsimultaneous transmit and receive (NSTR) links.

The above mainly introduces the solutions of the embodiments of the disclosure from the perspective of the execution process on the method side. It can be understood that, in order to realize the above-mentioned functions, the MLD includes a hardware structure and/or a software module corresponding to each function. Those skilled in the art should easily realize that, in combination with the modules and algorithm steps of the examples described in the embodiments provided herein, the disclosure can be implemented in the form of hardware or a combination of hardware and computer software. Whether a function is executed by hardware or computer software-driven hardware depends on the specific application and design constraints of the technical solution. Professional technicians can use different methods for each specific application to implement the described functions, but such implementation should not be considered beyond the scope of this application.

The embodiments of the disclosure may divide the functional module of the MLD according to the above method example, for example, each functional module may be divided corresponding to each function, or two or more functions may be integrated into one processing module. The above integrated module may be implemented in the form of hardware or software functional module. It should be noted that the division of the modules in the embodiments of the disclosure is schematic, and is only a division of logical functions. In actual implementation, there may be another division manner.

Figure 10:
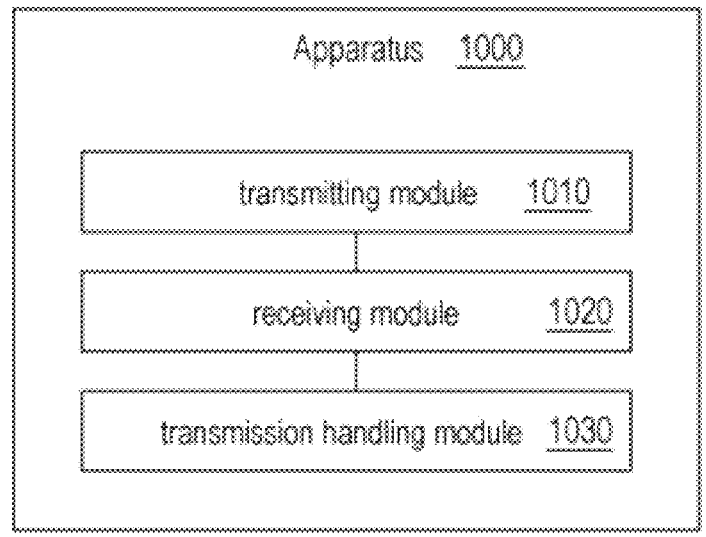
FIG. 10 is a block diagram of a data transmission apparatus according to an exemplary embodiment of the present disclosure.

FIG. 10 is a block diagram of a data transmission apparatus 1000 according to an exemplary embodiment of the present disclosure. Referring FIG. 10, the apparatus 1000 may include, but is not limited thereto, a transmitting module 1010, a receiving module 1020, and a transmission handling module 1030.

In one embodiment, the transmitting module 1010 is configured for transmitting, by a first non-access point (non-AP) station (STA) affiliated with a non-AP multi-link device (MLD), a first frame. The first frame includes first transmission mode information related to one of transmission modes of the non-AP MLD, and the transmission modes allow none or at least one of the first non-AP STA and a second non-AP STA affiliated with the non-AP MLD operating on one of links has a right to initiate a transmission opportunity (TXOP) for frame exchange.

In one embodiment, the receiving module 1020 is configured for receiving, by the first non-AP STA affiliated with the non-AP MLD, a second frame, and then the with the non-AP MLD is operating in an EML mode one the links (e.g., EMLSR links or EMLMR links). The second frame includes second transmission mode information, the second transmission mode information indicates the one of the transmission modes of the non-AP MLD, and the second first transmission mode information is an acknowledgment of the first transmission mode information.

In one embodiment, the transmission handling module 1030 is configured for waiting, by the non-AP MLD, a transition delay, and then with the non-AP MLD is operating in an EML mode one the links (e.g., EMLSR links or EMLMR links).

In one embodiment, the transmission handling module 1030 is configured for initiating, by the non-AP MLD, the frame exchange on one of the links with an AP affiliated with an AP MLD according to the first transmission mode information.

In one embodiment, the transmission handling module 1030 is configured for disabling initiating, by the non-AP MLD, the frame exchange on one of the links with an AP affiliated with an AP MLD according to the first transmission mode information.

In one embodiment, the transmission handling module 1030 is configured for determining that a first non-AP STA affiliated with a non-AP MLD on a first link of links loses medium synchronization due to a transmission event of a second non-AP STA affiliated with the non-AP MLD or the first non-AP STA affiliated with the non-AP MLD intends for UL transmission. The transmitting module 1010 is configured for transmitting, by a second non-AP STA affiliated with the non-AP MLD, access point (AP) assistance request information on a second link of the links. The AP assistance request information is used to solicit an assisting AP affiliated with an AP MLD to assist the first non-AP STA affiliated with the non-AP MLD operating on the first link to recover the medium synchronization or to trigger the UL transmission.

In one embodiment, the receiving module 1020 is configured for receiving, by the first non-AP STA affiliated with the non-AP MLD, the trigger frame to solicit a frame response.

In one embodiment, the receiving module 1020 is configured for receiving, by the first non-AP STA affiliated with the non-AP MLD, the trigger frame. The trigger frame indicates a time duration allocated to the first non-AP STA within a TXOP obtained by the assisting AP affiliated with the AP MLD.

In one embodiment, the receiving module 1020 is configured for receiving, by the first non-AP STA affiliated with the non-AP MLD, the trigger frame. The trigger frame indicates a TXOP to which a frame with the AP assistance request information belongs.

In one embodiment, the receiving module 1020 is configured for receiving, by the first non-AP STA affiliated with the non-AP MLD, the trigger frame to solicit an UL PPDU.

In one embodiment, the receiving module 1020 is configured for receiving, by the first non-AP STA affiliated with the non-AP MLD, the trigger frame within a response timeout interval. The trigger frame indicates to solicit a transmission on the first link associated with the first non-AP STA affiliated with the non-AP MLD, and the AP assistance request information includes the response timeout interval used for a response from the assisting AP affiliated with an AP MLD.

In one embodiment, the transmission handling module 1030 is configured for determining, by the first non-AP STA affiliated with the non-AP MLD, the AP assistance request information being outdated when the response timeout interval expires.

Figure 11:
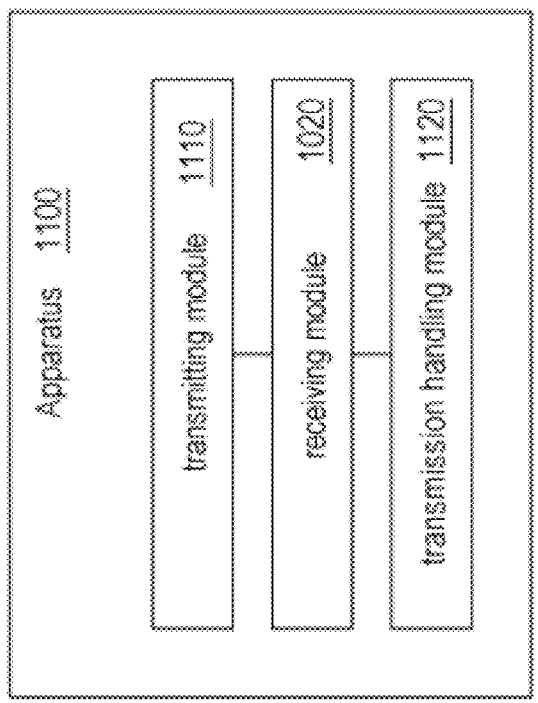
FIG. 11 is a block diagram of a data transmission apparatus according to an exemplary embodiment of the present disclosure.

FIG. 11 is a block diagram of a data transmission apparatus according to an exemplary embodiment of the present disclosure. Referring to FIG. 11, the apparatus 1100 may include but is not limited thereto, a transmitting module 1110, a receiving module 1020 and a transmission handling module 1120.

In one embodiment, the receiving module 1020 is configured for receiving, by a first AP affiliated with an AP MLD, a first frame, the first frame comprising transmission mode information related to one of transmission modes of a non-AP MLD, and the transmission modes allowing none or at least one of a first non-AP STA and a second non-AP STA affiliated with the non-AP MLD operating on one of links has a right to initiate a TXOP for frame exchange.

In one embodiment, the transmitting module 1110 is configured for transmitting, by the second AP affiliated with the AP MLD, a trigger frame to solicit a frame response.

In one embodiment, the transmitting module 1110 is configured for transmitting, by the second AP affiliated with the AP MLD, a trigger frame. The trigger frame indicates a time duration allocated to the first non-AP STA within a transmission opportunity (TXOP) obtained by the first AP affiliated with the AP MLD.

In one embodiment, the transmitting module 1110 is configured for transmitting, by the second AP affiliated with the AP MLD, a trigger frame. The trigger frame indicates a TXOP to which a frame with the AP assistance request information belongs.

In one embodiment, the transmitting module 1110 is configured for transmitting, by the second AP affiliated with the AP MLD, a trigger frame to solicit an UL PPDU.

In one embodiment, the transmitting module 1110 is configured for transmitting, by the second AP affiliated with the AP MLD, a trigger frame within a response timeout interval. The trigger frame indicates solicit a transmission on the first link associated with the first AP affiliated with the non-AP MLD, and the AP assistance request information includes the response timeout interval used for a response from the first AP affiliated with the AP MLD.

In one embodiment, the transmitting module 1110 is configured for transmitting, by the first AP affiliated with the AP MLD, a second frame. The second frame includes second transmission mode information, the second transmission mode information indicates the one of the transmission modes of the non-AP MLD, and the second transmission mode information is an acknowledgment of the first transmission mode information.

In one embodiment, the transmission handling module 1120 is configured for initiating, by the AP MLD, the frame exchange on one of links with the non-AP MLD according to the first transmission mode information.

In one embodiment, the transmission handling module 1120 is configured for disabling initiating, by the AP MLD, the frame exchange on one of links with the non-AP MLD according to the first transmission mode information.

In one embodiment, the transmitting module 1120 is configured for disabling transmitting, by a third AP affiliated with the AP MLD, the trigger frame when the second AP affiliated with the AP MLD has transmitted the trigger frame.

In one embodiment, the transmitting module 1120 is configured for disabling transmitting, by a third AP affiliated with the AP MLD, the trigger frame when the second AP affiliated with the AP MLD has transmitted the trigger frame and received a response to the trigger frame.

Figure 12:
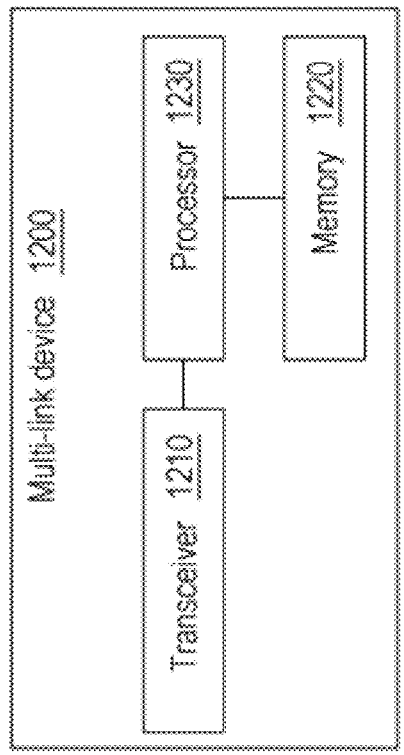
FIG. 12 is a block diagram of a multi-link device according to an exemplary embodiment of the present disclosure.

FIG. 12 is a block diagram of a multi-link device 1200 according to an exemplary embodiment of the present disclosure. Referring to FIG. 12, the multi-link device 1200, which is applied to the aforementioned non-AP MLD or AP MLD, may include one or more transceivers 1210, one or more memories 1220, and one or more processors 1230. A program code is stored on the memory 1220 and run on the processor 1230. The program code implements the steps of the data transmission method described in any one of FIG. 1 and FIG. 9 when being executed by the processor. The transceivers 1210 communicate with other electronic devices over a wireless network (e.g., WLAN) and typically operate according to IEEE standards (e.g., IEEE 802.11ax, IEEE 802.11ay, IEEE 802.11be, etc.). One transceiver 1210 may establish one link (e.g., a primary link or a nonprimary link). The multi-link device 1200 may be any type of device that includes, but are not limited to subscriber equipment, wireless transmitter/receiver unit (WTRU), mobile station, an advanced mobile station (AMS), a telephone apparatus, customer premise equipment (CPE), a wireless sensor, a handheld device with wireless communication function, a computing device or other processing devices connected to wireless modems, an in-vehicle device, a wearable device, or the like.

Since the program code stored in the multi-link device 1200 adopts all the technical solutions of all the foregoing embodiments when being executed by the processor 1230, it at least has all the advantageous effects brought by all the technical solutions of all the foregoing embodiments, and no further description is incorporated herein.

Furthermore, an embodiment of the present disclosure further provides a non-transitory computer-readable storage medium having a program code stored on the computer-readable storage medium to cause a computer to perform the data transmission method described in any one of FIG. 1 and FIG. 9.

Since the program code stored in the computer-readable storage medium adopts all the technical solutions of all the foregoing embodiments when being executed by the processor, it at least has all the advantageous effects brought by all the technical solutions of all the foregoing embodiments, and no further description is incorporated herein.

It should be noted that, for the foregoing method embodiments, for the sake of simple description, they are all described as a series of action combinations. However, those skilled in the art should know that this application is not limited by the described action order. Because according to the disclosure, certain steps may be performed in another order or simultaneously. Secondly, those skilled in the art should also know that the embodiments described in the specification are all preferred embodiments, and the actions and modules involved are not necessarily required for this application.

In the above embodiments, the description of each embodiment has its own emphasis. For a part that is not described in detail in one embodiment, reference may be made to related descriptions in other embodiments.

In the several embodiments provided in this application, it should be understood that the disclosed device may be implemented in other ways. For example, the device embodiments described above are only schematic. For example, the division of the module is only a logical function division. In actual implementation, there may be another division manner. For example, multiple modules or components may be combined or may Integration into another system, or some features can be ignored or not implemented. In addition, the displayed or discussed mutual coupling or direct coupling or communication connection may be indirect coupling or communication connection through some interfaces, devices or modules, and may be electrical or other forms.

The modules described as separate components may or may not be physically separated, and the components displayed as modules may or may not be physical units, may be located in one place, or may be distributed on multiple network units. Some or all of the modules may be selected according to actual needs to achieve the objective of the solution of this embodiment.

In addition, each functional module in each embodiment of the disclosure may be integrated into one processing module, or each of the modules may exist separately physically, or two or more modules may be integrated into one module. The above integrated module may be implemented in the form of hardware or in the form of software program modules.

When the integrated module is implemented in the form of a software program module and sold or used as an independent product, it may be stored in a computer-readable memory. Based on such an understanding, the technical solution of the disclosure essentially or part that contributes to the existing technology or all or part of the technical solution can be embodied in the form of a software product, which is stored in a memory, several instructions are included to enable a computer device (which may be a personal computer, a server, or a network device, etc.) to perform all or part of the steps of the method described in the embodiments of the disclosure. The foregoing memory includes a flash disk, a read-only memory (ROM), a random access memory (RAM), a mobile hard disk, a magnetic disk, or an optical disk, and other media that can store program codes.

The embodiments of the disclosure further provide a chip. The chip includes a processor, and the processor can call and run a computer program from the memory to implement the method in the embodiment of the disclosure.

Optionally, the chip may further include a memory. The processor may call and run a computer program from the memory to implement the method in the embodiment of the disclosure.

The memory may be a separate device independent of the processor, or may be integrated in the processor.

Optionally, the chip may further include an input interface. The processor can control the input interface to communicate with other devices or chips, and specifically, can obtain information or data sent by other devices or chips.

Optionally, the chip may further include an output interface. The processor can control the output interface to communicate with other devices or chips, and specifically, can output information or data to other devices or chips.

Optionally, the chip can be applied to the network device in the embodiment of the disclosure, and the chip can implement the corresponding process implemented by the network device in various methods in the embodiment of the disclosure. For conciseness, related details are omitted.

Optionally, the chip can be applied to the mobile terminal/terminal device in the embodiment of the disclosure, and the chip can implement the corresponding process implemented by the mobile terminal/terminal device in various methods in the embodiment of the disclosure. For conciseness, related details are omitted.

It should be understood that the chip mentioned in the embodiment of the disclosure may also be referred to as a system-level chip, a system chip, a chip system, or a system-on-chip, etc.

It should be understood that the memory described above is exemplary but not restrictive. For example, the memory in the embodiment of the disclosure may also be static RAM (SRAM), dynamic RAM (DRAM), synchronous DRAM (SDRAM), double data rate SDRAM (DDR SDRAM), enhanced SDRAM (ESDRAM), synch link DRAM (SL-DRAM) and Direct Rambus RAM (DR RAM), etc. That is to say, the memory in the embodiments of the disclosure is intended to include, but is not limited to, these and any other suitable types of memory.

The embodiments of the disclosure further provide a computer program product, including computer program instructions.

Optionally, the computer program product may be applied to the communication device in the embodiment of the disclosure, and the computer program instructions enable the computer to execute the corresponding process implemented by the communication device in various methods of the embodiment of the disclosure. For conciseness, related details are omitted.

The embodiment of the disclosure further provides a computer program.

Optionally, the computer program can be applied to the communication device in the embodiment of the disclosure. When the computer program is run on the computer, the computer can execute the corresponding process implemented by the communication device in various methods of the embodiment of the disclosure. For conciseness, related details are omitted.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

The invention claimed is:

1. A data transmission method, characterized by, the data transmission method comprising:
    transmitting, by a first non-access point (non-AP) station (STA) affiliated with a non-AP multi-link device (MLD), a first frame, the first frame comprising first transmission mode information related to one of transmission modes of the non-AP MLD, and the transmission modes allowing none or at least one of the first non-AP STA and a second non-AP STA affiliated with the non-AP MLD operating on one of links has a right to initiate a transmission opportunity (TXOP) for frame exchange.

2. A multi-link device (MLD), the MLD being a non-access point (non-AP) MLD, comprising:
    a memory configured to store instructions;
    a processor coupled with the memory, wherein the processor is configured to execute the instructions to cause the non-AP MLD to perform:
    transmitting, by a first non-AP station (STA) affiliated with the non-AP MLD, a first frame, the first frame comprising first transmission mode information related to one of transmission modes of the non-AP MLD, and the transmission modes allowing none or at least one of the first non-AP STA and a second non-AP STA affiliated with the non-AP MLD operating on one of links has a right to initiate a transmission opportunity (TXOP) for frame exchange.

3. The MLD according to claim 2, wherein the processor is further configured to execute the instructions to cause the non-AP MLD to perform:

receiving, by the first non-AP STA affiliated with the non-AP MLD, a second frame, the second frame comprising second transmission mode information, the second transmission mode information indicating the one of the transmission modes of the non-AP MLD, and the second transmission mode information being an acknowledgment of the first transmission mode information, and then the non-AP MLD operating in an enhanced multi-link (EML) mode on the links.

4. The MLD according to claim 2, wherein the processor is further configured to execute the instructions to cause the non-AP MLD to perform:
waiting, by the non-AP MLD, a transition delay, and then the non-AP MLD operating in an EML mode on the links.

5. The MLD according to claim 3, wherein the second transmission mode information is a response of a request of the one of the transmission modes, the response is sent by an access point (AP) MLD.

6. The MLD according to claim 2, wherein the processor is further configured to execute the instructions to cause the non-AP MLD to perform:
initiating, by the non-AP MLD, the frame exchange on one of the links with an AP affiliated with an AP MLD according to the first transmission mode information.

7. The MLD according to claim 2, wherein the processor is further configured to execute the instructions to cause the non-AP MLD to perform:
disabling initiating, by the non-AP MLD, the frame exchange on one of the links with an AP affiliated with an AP MLD according to the first transmission mode information.

8. The MLD according to claim 2, wherein a first mode of the transmission modes indicates it is allowed that any one of the first non-AP STA and the second non-AP STA affiliated with the non-AP MLD has the right to initiate the TXOP for the frame exchange on one of the links and merely one of the first non-AP STA and the second non-AP STA affiliated with the non-AP MLD initiates the frame exchange on one of the links at a time.

9. The MLD according to claim 2, wherein a second mode of the transmission mode indicates it is disallowed that the first non-AP STA and the second non-AP STA affiliated with the non-AP MLD initiate the frame exchange.

10. The MLD according to claim 2, wherein a third mode of the transmission mode indicates it is allowed at least one of the first non-AP STA and the second non-AP STA has the right to initiate the TXOP for the frame exchange on a subset of the links and merely one of the first non-AP STA and the second non-AP STA affiliated with the non-AP MLD initiates the frame exchange on one of the links at a time.

11. The MLD according to claim 2, wherein the first transmission mode information is specified in an uplink transmission mode subfield.

12. A multi-link device (MLD), the MLD being an access point (AP) MLD, comprising:
a memory configured to store instructions;
a processor, coupled with the memory, wherein the processor is configured to execute the instructions to cause the AP MLD to perform:
receiving, by a first access point (AP) affiliated with the AP MLD, a first frame, the first frame comprising transmission mode information related to one of transmission modes of a non-AP MLD, and the transmission modes allowing none or at least one of a first non-AP station (STA) and a second non-AP STA affiliated with the non-AP MLD operating on one of links has a right to initiate a transmission opportunity (TXOP) for frame exchange.

13. The MLD according to claim 12, wherein the processor is further configured to execute the instructions to cause the AP MLD to perform:
transmitting, by the first AP affiliated with the AP MLD, a second frame, the second frame comprising second transmission mode information, the second transmission mode information indicating the one of the transmission modes of the non-AP MLD, and the second transmission mode information being an acknowledgment of the first transmission mode information.

14. The MLD according to claim 13, wherein the second transmission mode information is a response of a request of the one of the transmission modes, the response is sent by the AP MLD.

15. The MLD according to claim 12, wherein the processor is further configured to execute the instructions to cause the AP MLD to perform:
initiating, by the AP MLD, the frame exchange on one of links with the non-AP MLD according to the first transmission mode information.

16. The MLD according to claim 12, wherein the processor is further configured to execute the instructions to cause the AP MLD to perform:
disabling initiating, by the AP MLD, the frame exchange on one of the links with the non-AP MLD according to the first transmission mode information.

17. The MLD according to claim 12, wherein a first mode of the transmission modes indicates it is allowed that any one of the first non-AP STA and the second non-AP STA affiliated with the non-AP MLD has a right to initiate a transmission opportunity (TXOP) for the frame exchange on one of the links and merely one of the first non-AP STA and the second non-AP STA affiliated with the non-AP MLD initiates the frame exchange on one of the links at a time.

18. The MLD according to claim 12, wherein a second mode of the transmission mode indicates it is disallowed that the first non-AP STA and the second non-APSTA affiliated with the non-AP MLD initiate the frame exchange.

19. The MLD according to claim 12, wherein a third mode of the transmission mode indicates it is allowed at least one of a first non-AP STA and a second non-AP STA has a right to initiate the TXOP for the frame exchange on a subset of the links and merely one of the first non-AP STA and the second non-AP STA affiliated with the non-AP MLD initiates the frame exchange on one of the links at a time.

20. The MLD according to claim 12, wherein links corresponding to the first transmission mode information is specified in an uplink transmission mode subfield.

* * * * *